(12) United States Patent
Lloyd

(10) Patent No.: US 12,525,773 B2
(45) Date of Patent: Jan. 13, 2026

(54) TEMPORARY ELECTRICAL BOX COVERS

(71) Applicant: Patrick Michael Lloyd, Waterford, MI (US)

(72) Inventor: Patrick Michael Lloyd, Waterford, MI (US)

(*) Notice: Subject to any disclaimer, the term of this patent is extended or adjusted under 35 U.S.C. 154(b) by 0 days.

(21) Appl. No.: 17/688,317

(22) Filed: Mar. 7, 2022

(65) Prior Publication Data

US 2022/0190572 A1  Jun. 16, 2022

Related U.S. Application Data

(62) Division of application No. 16/587,634, filed on Sep. 30, 2019, now Pat. No. 11,271,380.

(60) Provisional application No. 62/756,621, filed on Nov. 7, 2018.

(51) Int. Cl.
    *H02G 3/08* (2006.01)
    *H02G 3/12* (2006.01)

(52) U.S. Cl.
    CPC .............. *H02G 3/081* (2013.01); *H02G 3/086* (2013.01); *H02G 3/12* (2013.01)

(58) Field of Classification Search
    CPC .......... H02G 3/081; H02G 3/086; H02G 3/12; H02G 3/14; H02G 3/185; H02G 3/123; Y10S 248/906
    See application file for complete search history.

(56) References Cited

U.S. PATENT DOCUMENTS

| | | | | |
|---|---|---|---|---|
| 1,228,731 A | * | 6/1917 | Abbott et al. | H02G 3/14 174/53 |
| 5,639,991 A | * | 6/1997 | Schuette | H02G 3/12 33/528 |
| 6,166,329 A | * | 12/2000 | Oliver | H02G 3/14 174/67 |
| 6,323,424 B1 | | 11/2001 | He | |
| 6,538,202 B1 | * | 3/2003 | Shaffer | H02G 3/00 174/67 |
| 6,686,540 B2 | | 2/2004 | Compagnone, Jr. | |
| 7,432,444 B1 | | 10/2008 | McCusker | |
| 7,763,798 B1 | * | 7/2010 | Shotey | H02G 3/14 174/67 |
| 9,258,919 B1 | * | 2/2016 | Rose | H01R 13/405 |
| 2003/0213801 A1 | * | 11/2003 | Bradley | H02G 3/121 220/241 |

(Continued)

FOREIGN PATENT DOCUMENTS

CA    2462380 C    9/2004

*Primary Examiner* — Roshn K Varghese
(74) *Attorney, Agent, or Firm* — Fitch, Even, Tabin & Flannery, LLP

(57) ABSTRACT

A protective cover to cover an opening of an electrical box having a threaded bore on inwardly projecting protrusions. In one approach the protective cover may have a back panel and four side panels together defining an interior cavity; a flange connected to a free edge of the side panels; wherein the flange has a pair of keyhole shaped bores defining a pair of openings along a center longitudinal axis of the flange; and wherein the keyhole openings are configured to allow a head of a screw to extend from the threaded bore and through a rounded portion of the keyhole opening and to allow a threaded shaft of the screw to slide along the length of an elongated narrow portion of the keyhole opening, the narrow portion being narrower than the diameter of the screw head.

1 Claim, 6 Drawing Sheets

(56) References Cited

U.S. PATENT DOCUMENTS

2005/0269123 A1* 12/2005 Diegel .................... H02G 3/14
174/66
2009/0272558 A1* 11/2009 Compagnone, Jr. ... H02G 3/126
174/58

* cited by examiner

TEMPORARY ELECTRICAL BOX COVERS

CROSS-REFERENCE TO RELATED APPLICATIONS

This application is divisional application of and claims priority to U.S. application Ser. No. 16/587,634, filed Sep. 30, 2019, which claims priority from U.S. Provisional Patent Application 62/756,621, filed Nov. 7, 2018, all of which are hereby incorporated herein by reference in their entirety for all purposes.

FIELD

Presented herein are electrical box covers, and in particular, temporary electrical box covers configured to protect the contents of the interior cavity of an electrical box, such as electrical wiring, outlets, switches, and the like, while, for example, wallboard is hung, cut, plastered, sanded and painted over the electrical box opening by providing quick connect means to attach and detach the temporary electrical box cover to threaded bores of inwardly projecting protrusions extending across the electrical box opening.

BACKGROUND

Electrical boxes are known in the art and are commonly used in ceilings as a mounting structure for installing lights, fans and the like. Electrical boxes can also serve as a connection point for connecting electrical devices on walls such as outlets and switches to electrical wires connected to a main power source.

Electrical boxes are typically shaped to include a back panel and typically four side panels which project perpendicularly from the back panel. The back panel and side panels together define an interior cavity into which electrical wiring is received. The side panels includes a free front edge that collectively define an opening which provides access to the interior cavity of the electrical box. This electrical box opening needs to be accessible through openings in wall coverings, such as wall board, paneling and the like.

Electrical boxes also commonly include one or more exteriorly/outwardly projecting tabs used for mounting the electrical box to a support structure, such as a wall stud (e.g., a two-by-four). Specifically, each exteriorly projecting tab is configured to receive a securing device, such as a nail or screw, which, in turn, can be mounted onto the support structure. Other inwardly projecting protrusions of the electrical box can be adapted to receive screws or other mounting hardware of a switch, outlet or other device to be attached to the electrical box. Such inwardly projecting protrusions typically extend across the electrical box opening and have a threaded bore (See generally, U.S. Pat. No. 7,432,444 to McCusker)

During construction, after an electrical box is attached to a wall stud or other structural member, electrical wiring connected to the main electrical power source is run amongst the structural members and into the various areas of the site. Having mounted the electrical boxes onto studs and having fed selected electrical wires into the interior cavity of the wall boxes, wall paneling, typically sheet rock but also referred to as wall board, can be mounted onto the support beams to enclose the wall. In practice, sections of wall board are typically mounted to the support beams directly over the electrical boxes.

To regain access to the electrical box opening once the wallboard is installed, a wall board installer locates and removes the wallboard covering the electrical box opening to regain access to the interior cavity of the box. Conventionally, a router or knife can be used to pierce through the wall board and cut out a hole exposing each box. The location of each box behind the wall board can be found through a variety of ways such as by drilling a hole through the wall board at the estimated placement of the electrical boxes. The problem in the art is the potential for the router and/or drill to nick or otherwise damage the pre-installed wiring inside the electrical box interior cavity.

Once the wall board has been cut so as to expose the interior cavity of the electrical box, the wall board is typically plastered to cover tape and mounting screws. Too often the plaster and the like during this phase enters the electrical boxes and must later be removed.

Further, after the wall board has been plastered and sanded, paint can be applied to the wall board, thereby completing construction of the walls of the rooms. A primer paint coat is often applied to the walls with a spray gun and the paint can easily be sprayed into the electrical box opening and onto the installed wires. It can be difficult to remove this paint to identify the color of the wires adding to risk of wiring errors. Also, some paints may contain chemicals that are detrimental to the plastic insulation on the wires.

With construction of the walls having been completed, an electrician can connect the electrical outlets, switches and the like to the wires in the interior cavity of the electrical boxes to electrically connect them to a main power source. Next, outlets and switches and the like can be screwed in place using one or more screws through openings formed in the electrical outlets and switches and into a threaded bore formed on the inwardly projecting protrusions from the free edge of the side walls across the opening of the electrical box. A cover plate can then be mounted over the outlets, switches etc. and secured in place by one or more screws to the electrical device.

Accordingly, there is a need in the art for temporary protective covers to cover the aforementioned electrical box openings. These temporary covers should provide quick installation to an electrical box before wallboard is applied and quick release after the wallboards has been removed, plastered, sanded and painted. Although temporary electrical box protectors have been attempted in the art, further improvements are desirable to not only provide for faster installation but also that are more economical than previously known.

SUMMARY

Accordingly, to advance at least the aforementioned deficiencies in the art, described herein are temporary electrical box covers having means to be quickly installed into threaded bores of inwardly projecting protrusions of the side walls of the electrical box.

According to one approach a protective cover configured to cover an opening of an electrical box where the electrical box has a threaded bore on inwardly projecting protrusions over the electrical box opening, the protective cover may have a back panel; four side panels which project perpendicularly from the back panel; the back panel and side panels together defining an interior cavity; the side panels at the opposite ends from the back panel having a free front edge that collectively define an opening which provides access to the interior cavity; a flange connected to the free edge of the side panels; wherein the flange has a pair of keyhole shaped bores defining a pair of openings along a center longitudinal axis of the flange; and wherein the keyhole openings are configured to allow a head of a screw to extend from the threaded bore and through a rounded portion of the keyhole opening and to allow a threaded shaft of the screw to slide along the length of an elongated narrow portion of the keyhole opening, the narrow portion being narrower than the diameter of the screw head. The protective cover may also have least one tapered and ribbed pin extending outwardly from one side panel and corresponding bore sized and placed on the opposing side panel, wherein two or more protective covers can be ganged together.

According to one approach a protective cover configured to cover an opening of an electrical box where the electrical box has a threaded bore on inwardly projecting protrusions over the electrical box opening may have a back panel; four side panels which project perpendicularly from the back panel; the back panel and side panels together defining an interior cavity; the side panels at the opposite ends from the back panel having a free front edge that collectively define an opening which provides access to the interior cavity; a flange connected to the free edge of the side panels; wherein the flange has a pair of ribbed pliable pins extending alongside the side panels, the pin placement correlating with the positions of the threaded bores of the of inwardly projecting protrusions extending across the electrical box opening; and wherein the pins can be tapered from a base to a distal end in a range of about 1 to 25 degrees, and that the distal end of the pins is narrower in diameter than the opening of the threaded bores and the base of pins would be between 0.01 mm to 3 mm greater than the diameter of the threaded bore.

According to one approach a protective cover configured to cover an opening of an electrical box where the electrical box has a threaded bore on inwardly projecting protrusions over the electrical box opening may have a back panel; four side panels which project perpendicularly from the back panel; the back panel and side panels together defining an interior cavity; the side panels at the opposite ends from the back panel having a free front edge that collectively define an opening which provides access to the interior cavity; a flange connected to the free edge of the side panels, the flange having a pair of bores correlating with the positions of the threaded bores of the of inwardly projecting protrusions extending across the electrical box opening; and pliable push pins having a head, a tab extending from the push pin head, and a pin tapered from a base to a distal end in a range of about 1 to 25 degrees, and that the distal end of the pins is narrower in diameter than the opening of the threaded bores and the base of pins would be between 0.01 mm to 3 mm greater than the diameter of the threaded bore.

Other features will become more apparent to persons having ordinary skill in the art to which the assemblies pertain and from the following description and claims.

Figure 1:
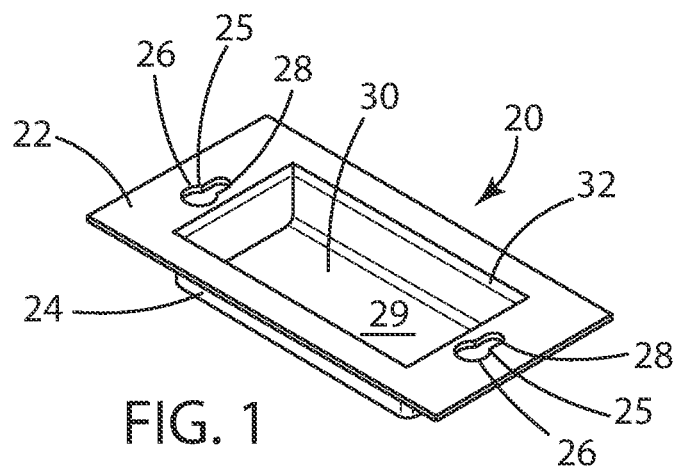
FIG. 1 illustrates an exemplary electrical box cover of the present embodiments.
Figure 2:
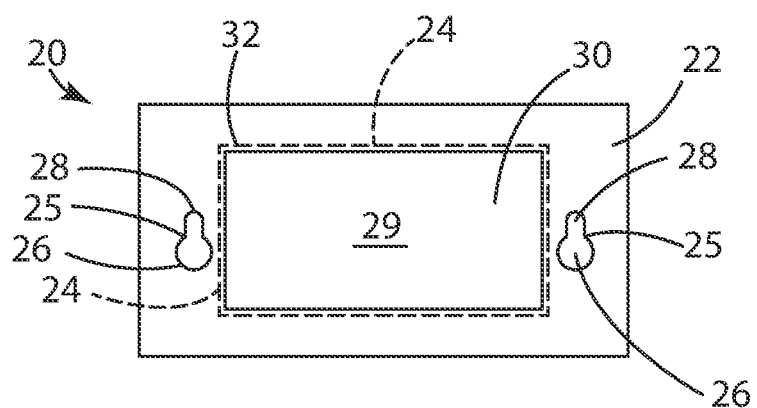
FIG. 2 illustrates a top view of the electrical box cover of FIG. 1.
Figure 3:
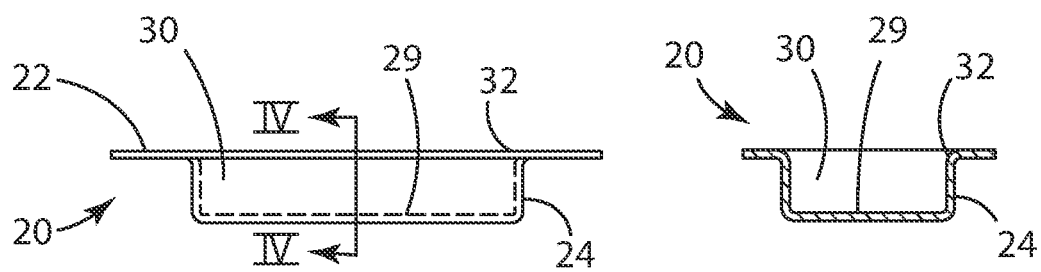
FIG. 3 illustrates a side view of the electrical box cover of FIG. 1.
Figure 4:
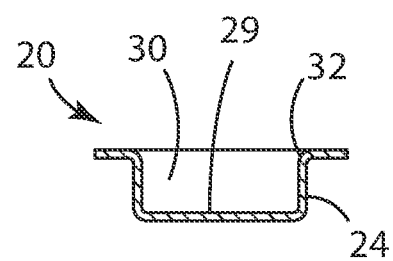
FIG. 4 illustrates a cross-sectional view of the electrical box cover of FIG. 1 taken along section lines IV-IV of FIG. 3.
Figure 5:
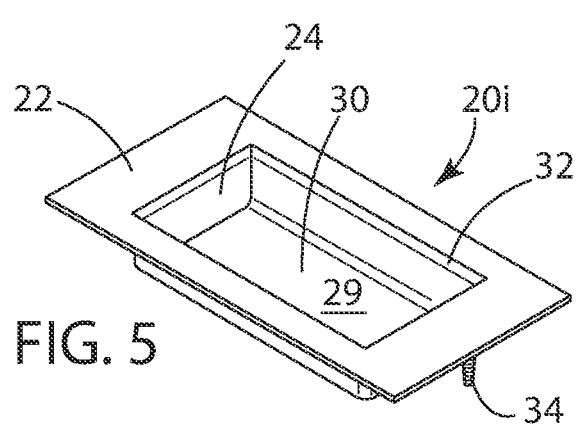
FIG. 5 illustrates an electrical box cover of the present embodiments according to another approach.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Presented herein are electrical box covers, and in particular, temporary electrical box covers configured to protect the contents of the interior cavity of an electrical box, such as electrical wiring, while, for example, wallboard is hung, cut, plastered, sanded and painted over the electrical box opening by providing quick connect means to attach and detach the temporary electrical box cover to threaded bores of inwardly projecting protrusions extending across the electrical box opening.

Accordingly, disclosed herein are embodiments suitable for use as a temporary electrical box cover. It is noted that although the examples in this disclosure relate to electrical box covers, the embodiments could also be incorporated in any situation where a temporary cover is desired over an opening. The present embodiments are configured to protect electrical wiring during construction, such as during the construction of new homes and commercial buildings, and also when repairing and renovating homes and buildings. The present embodiments are configured to cover installations of electrical devices/boxes in rough construction stages of homes and commercial buildings. For example, the present embodiments covers protect electrical devices (e.g., plugs and switches)/boxes from damage by workers that apply wallboard (dry wall) following the installation of these electrical devices/boxes. The box covers protect installed electrical devices/boxes from dry wall installation tools, dust, paint and other foreign materials that they can be subjected to during construction.

The present embodiments increase efficiency for contractors because the electrical box cover protectors eliminate waste when electrical devices/boxes are damaged. The box cover protectors also prevent additional labor costs to homeowners and builders because of the additional labor required to replace damaged electrical devices/boxes.

The present embodiments may be formed in a single piece by plastic injection molding, and the like, to fit specific electrical devices or other types of openings. Although the disclosure is described as having a plastic composition, it is noted that the embodiments could be formed from a variety of materials that do not conduct electricity, or any of a number of materials such as plastics, electrical grade plastics subject to building codes, glass, molded silicone, molded rubber (or other pliable material), or custom machined wood, composites, carbon fiber, and the like. For non-electrical uses, the materials used to form the cover could be formed of any material fit for purpose.

The present electrical box protector can be releasably connected to electrical devices/boxes with machine screws at the top and bottom of the box cover protector, push pins, snaps, hook and loop fasteners and other means to hold the cover rigidly in place to the point of withstanding the efforts to install drywall or other types of wall covers.

An electrician may attach the electrical box cover protector to electrical devices/boxes during installation of the electrical device/box. They can use screw drivers or screw guns to attach the electrical box cover protectors or simply push the pliable pins into the electrical box cover designated to receive the cover plate in final installation after the wall has been installed. In one embodiment, the electrical box cover protectors have a keyhole design at the top and bottom that makes them easy to remove without removing the screws of installed electrical devices/boxes that attach to the threaded bore of the inwardly projecting protrusions of the electrical box. The box covers can be reused multiple times. In short, the covers of the present embodiments may be installed in new installations of electrical boxes to protect new wiring within the interior cavity of the electrical box or in some embodiments added to cover installed electrical devices.

Figure 14:
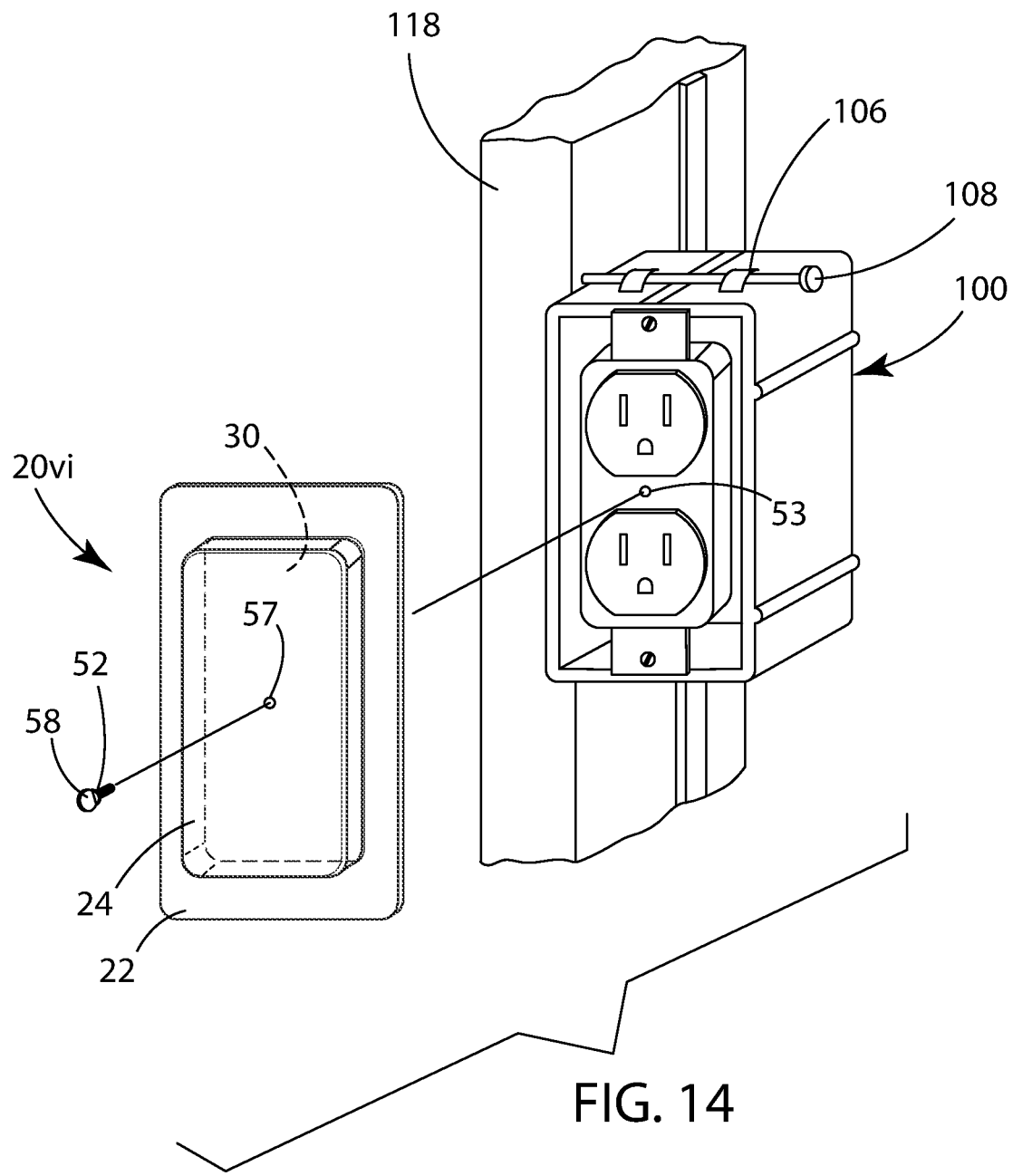
FIG. 14 illustrates an electrical box cover of the present embodiments according to another approach in its environment.
Figure 15:
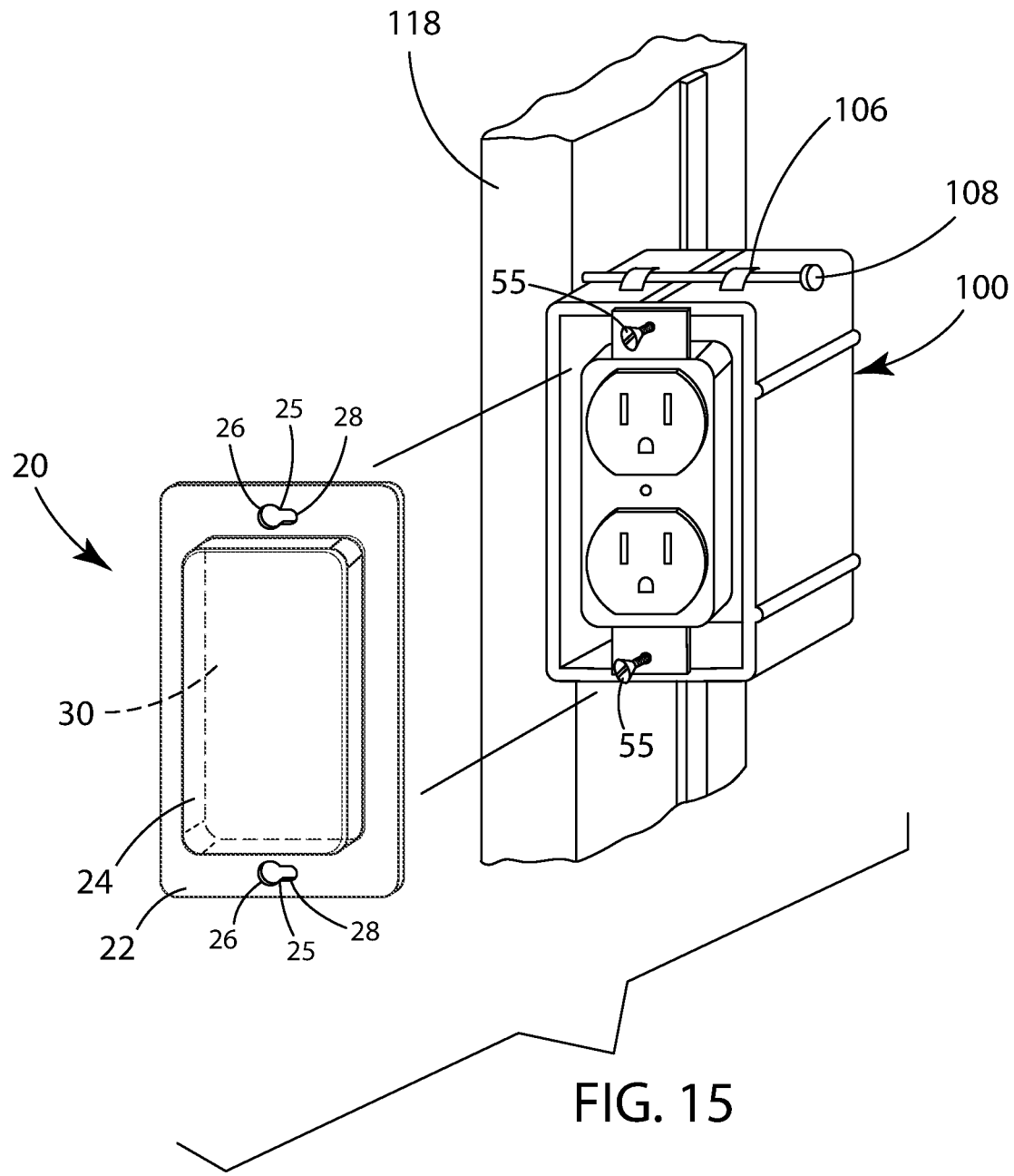
FIG. 15 illustrates the electrical box cover of FIG. 1 in its environment.
Figure 16:
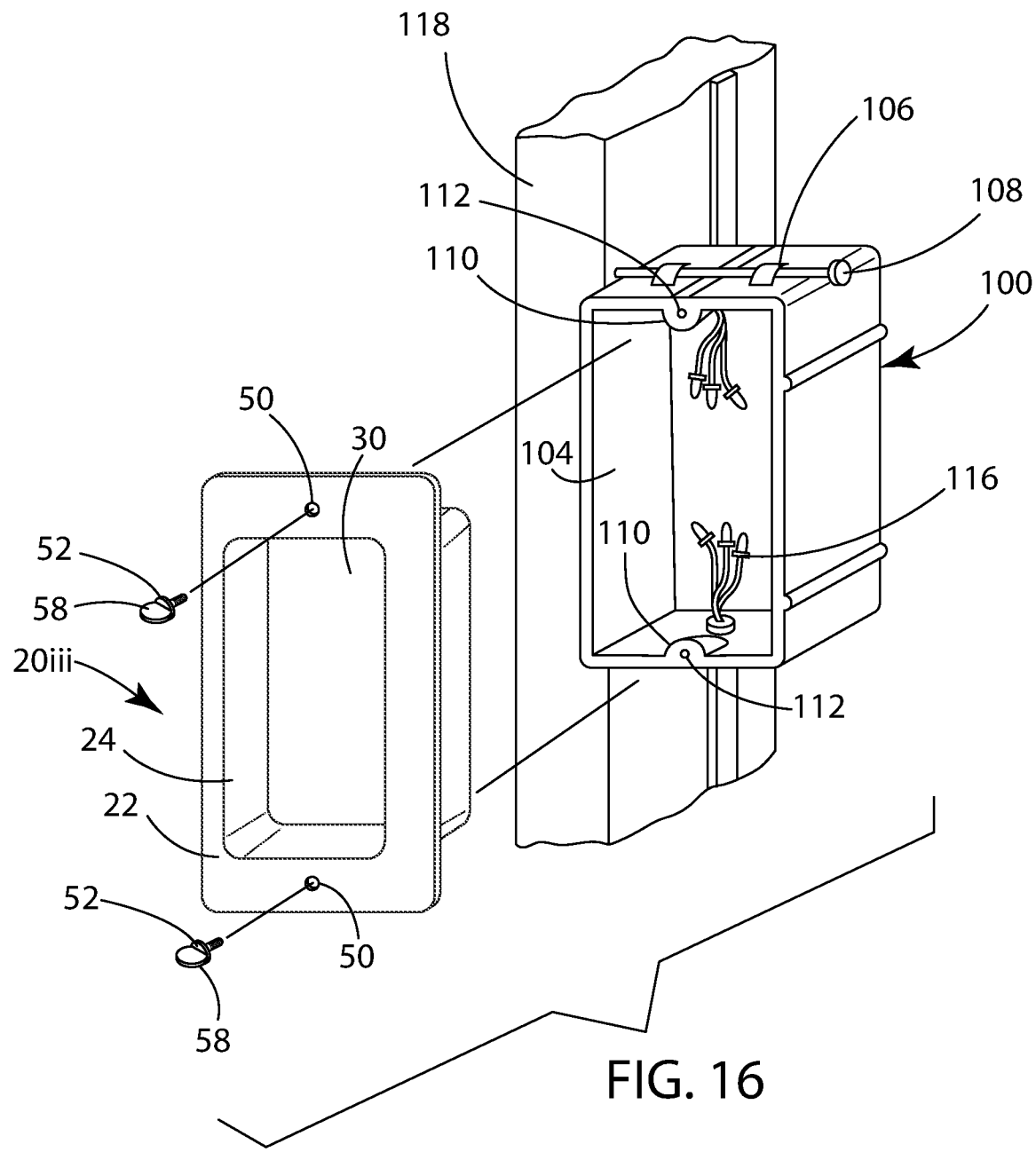
FIG. 16 illustrates the electrical box cover of FIG. 11 in its environment.

To show a typical environment for the present embodiments, FIG. 14-16 show an electrical box installation prior to attaching wall board on a wall. As shown, an electrical box 100 is mounted on a wall stud support structure 118 and shaped to include a back panel 102 and four side panels 104 which project perpendicularly from the back panel 102. The back panel 102 and side panels 104 together define an interior cavity 114 of the electrical box into which electrical wiring 116 is received. Exteriorly projecting tabs 106 are configured to receive a securing device 108, such as a nail or screw, which, in turn, can be mounted onto the wall stud 118. A threaded bore 112 is located on inwardly projecting protrusions 110 extending across the electrical box 100 opening and are configured to receive screws 55 typically used to install electrical devices within electrical box 100.

FIGS. 1-4 show one embodiment of the present temporary electrical box covers. In this embodiment an electrical box cover 20 has a back panel/base 29 and, by way of example only, four side walls/panels 24 which project perpendicularly from the back panel 29. The back panel and side panels together define an interior cavity 30. It is noted that there many types and shapes and sizes of electrical boxes and the electrical box shown is just for ease of understanding the intended environment for the covers of the present embodiments. Side panels 24 include a free front edge that collectively define an opening which provides access to interior cavity 30 of the electrical box cover 20 as well as a point of attachment of a flange 22. Flange 22 in this embodiment provides a pair of keyhole openings 25 along its longitudinal axis having a round portion 26 and an elongated narrower portion 28. The placement of keyhole openings 25 is configured to allow the heads of screws extending from the threaded bore of the inwardly projecting protrusions of the electrical box to extend through keyholes 25. It is noted that flange 22 is sized and shaped to cover the opening of the electrical box shown and accordingly, the flange size and shape could be adjusted to match the opening of any type of electrical box. Other features may include a radiused or beveled edge 32 of flange 22, typically about 0.06 inch radius.

In one embodiment, which may be formed from plastic, flange 22 can extend 4.17 inches in length along its longitudinal axis and 2.16 inches along its transverse axis. Keyholes 25 can be spaced 3.261 inches apart (or other dimension to correlate the spaces between threaded bores of the of inwardly projecting protrusions extending across the electrical box opening). Hole 26 can have a diameter of 0.31 inches and the distal end of the elongated narrower end 28 can terminate in a rounded end having a diameter 0.16 inches. Placement of keyhole 25 is configured so that the center of the radius of elongated narrower end 28 is in the center of the longitudinal axis of flange 22. For example, the center of hole 26 can be 0.885 inches from the same edge of flange 22, while the center of the radius of the elongated narrow portion 28 can be 1.160 inches from the same edge of flange 22. The side walls 24 can extend 0.564 inches perpendicular from back panel 29. Back panel 29 can be 2.7 inches along its longitudinal axis and 1.35 inches along its transverse axis. The thickness of the panels and flange can be 0.06 inches. It is noted that these are typical measurements and can be adjusted for different purposes. For example the dimensions can be adjusted so that the interior cavity can accommodate the sliding of cover 20 to secure cover 20 over narrow portion 28 of keyhole 25 without coming into contact with an installed electrical device, such as a switch or outlet (See e.g., FIG. 15). The outer flange dimensions, keyhole dimensions, panel thicknesses and the like can be applied to the dimensions of the additional embodiments described herein where included. It is noted that cover 20 can either be installed with the interior cavity 30 extending into the interior cavity of the electrical box (e.g., for ne installations), or the interior cavity 30 can be extended away from the interior cavity of the electrical box (e.g., when the electrical device remains installed.

Figure 6:
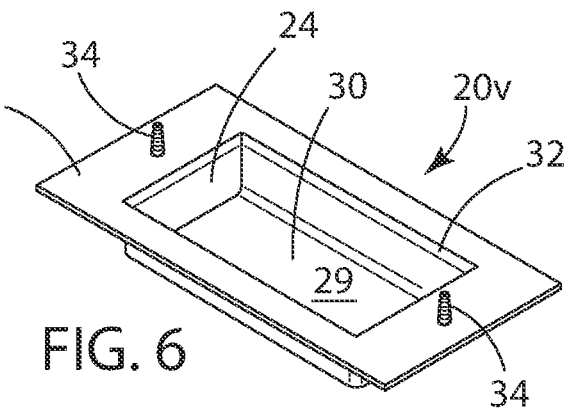
FIG. 6 illustrates an electrical box cover of the present embodiments according to another approach.
Figure 7:
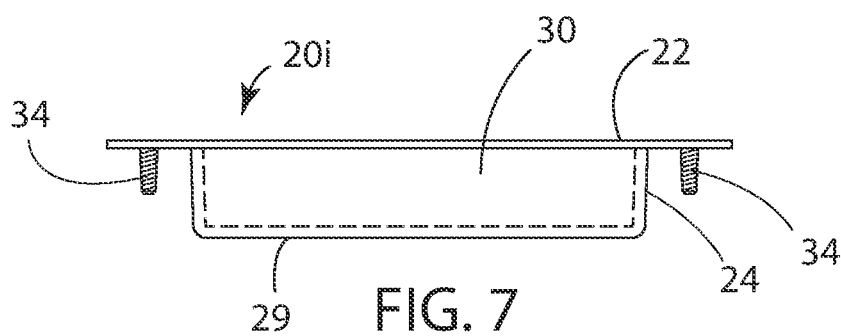
FIG. 7 illustrates a side view of the electrical box cover of FIG. 5.
Figure 8:
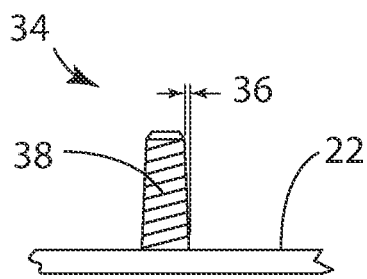
FIG. 8 illustrates a close-up view of pin 34 and pin 42 of FIGS. 5-7 and 10 respectively as an external thread.
Figure 9:
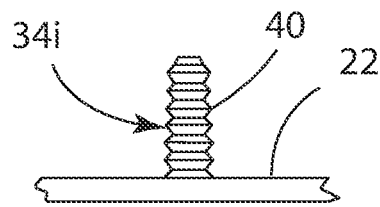
FIG. 9 illustrates a close-up view of pin 34 and pin 42 of FIGS. 5-7 and 10 respectively as a row of ribs.

FIGS. 5-9 show an electrical box cover 20i according to other approaches. In this embodiment, the threaded bore of the of inwardly projecting protrusions extending across the electrical box opening has no screws installed. Accordingly, pins/protrusions 34 can extend from flange 22 alongside the side panels 24 (FIG. 5) or on the side of the flange opposite the side panels (FIG. 6). Like the keyhole openings of FIG. 1, the position of pins 34 correlate with the positions and distance between the threaded bore of the of inwardly projecting protrusions extending across the electrical box opening. Pins 34 can be tapered from its base to its distal end in a range of about 1 to 25 degrees, preferable about 10 degrees so the that distal end is narrower in diameter than the opening of the threaded bore of the of inwardly projecting protrusions extending across the electrical box opening. The base of pin 34 would be approximately equal to or slightly greater than the diameter of the threaded bore of the of inwardly projecting protrusions extending across the electrical box opening. Cover 20i can be installed by the user simply pushing pins 34 into the threaded bore of the of inwardly projecting protrusions extending across the electrical box opening. Cover 20i can be removably retained in position by external threads 38 (FIG. 8) or horizontal ribs 40 (FIG. 9) along the length. Pins 34 can be made from a pliable material such as a pliable plastic. In some embodiments, the entire cover 20*i*, including pins 34 can be formed from a molded and/or pliable material such as silicone or rubber to allow for easier installation and removal.

Figure 10:
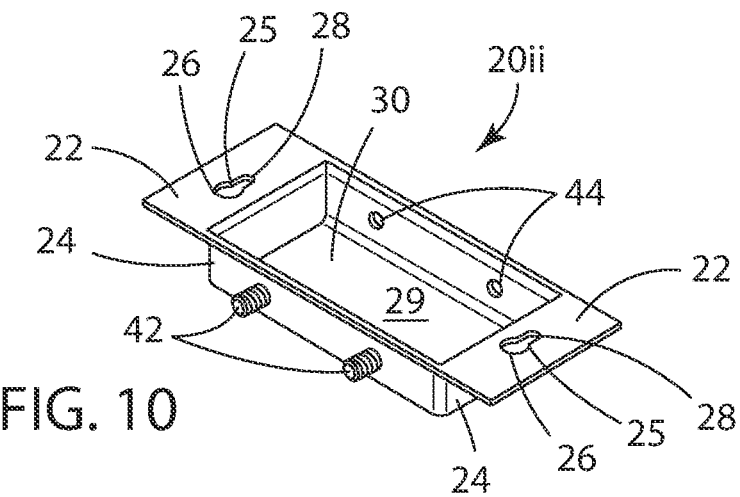
FIG. 10 illustrates an electrical box cover of the present embodiments according to another approach.
Figure 11:
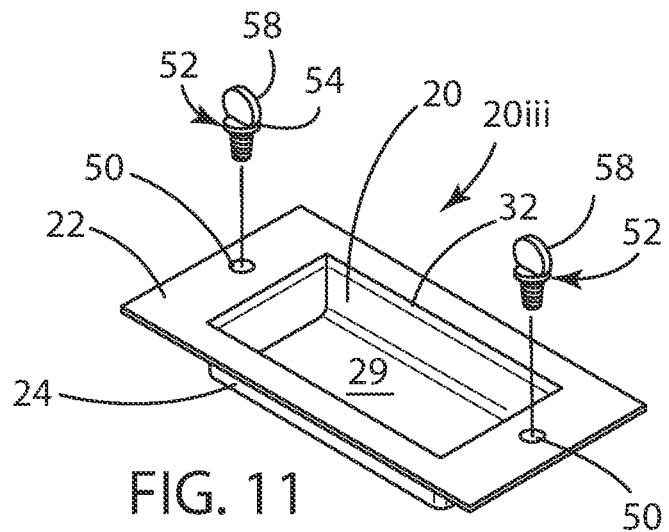
FIG. 11 illustrates an electrical box cover of the present embodiments according to another approach.
Figure 12:
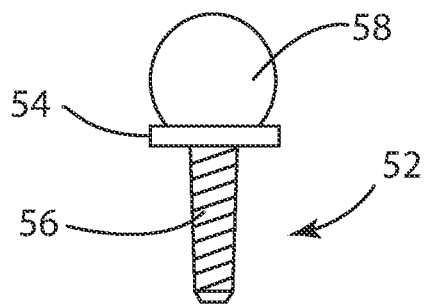
FIG. 12 illustrates a close-up view of push pin 52 of FIG. 11.

FIG. 10 shows an electrical box cover 20*ii* according to another approach. This embodiment has the optional feature of the side pins/protrusions 42 on one side panel 24 and corresponding holes 44 sized and placed on the opposing side panel 24. Pins 42, like pins 34 can be tapered and threaded or ribbed and pliable to be able to insert through hole 44 and be retained. In this instance, two or more covers 20*ii* can be ganged together to cover larger electrical boxes, such as electrical boxes that can accommodate multiple switches and/or outlets. In this embodiment the installer would not need to attach each end of each cover 20*ii* to the threaded bore of the of inwardly projecting protrusions extending across the electrical box opening FIGS. 11-12 show an electrical box cover 20*iii* according to another approach. Cover 20*iii* replaces keyhole 25 with flange openings 50 configured to receive push pins 52. Push pins 52 can be made of a pliable material (e.g., silicone, rubber, or pliable plastic) and have push pin head 54, push pin ribs 56, and push pin head tab 58. Tab 58 allows a user to install push pin 52 without aid of separate tools. Like keyhole 45, flange openings 50 are spaced corresponding to the threaded bore of the inwardly projecting protrusions of the electrical box. In use, during installation of cover 20*iii* the cover is placed over the electrical box such that openings 50 are in line with the threaded bore of the inwardly projecting protrusions of the electrical box. The user then takes a push pin 52 and threads it through opening 50 and into the threaded bore of the inwardly projecting protrusions of the electrical box. To remove cover 20*iii*, the use need only grab tab 58 and pull push pin out of the threaded bore of the inwardly projecting protrusions of the electrical box.

Figure 13:
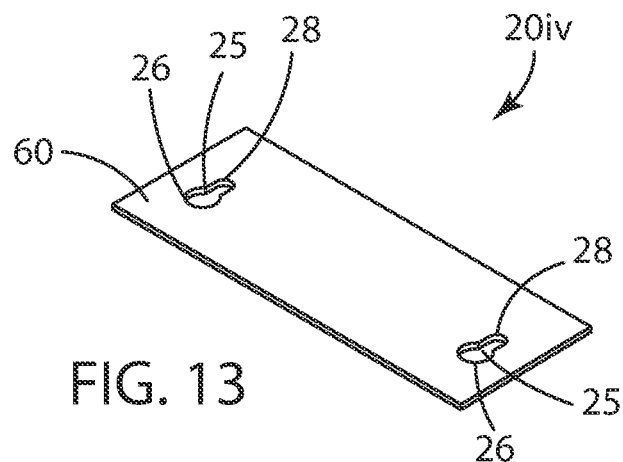
FIG. 13 illustrates an electrical box cover of the present embodiments according to another approach.

FIG. 13 show an electrical box cover 20*iv* according to another approach. In this approach, cover 20*iv* has a plate 60 with the keyholes 25 sized and placed as in cover 20.

FIG. 14 illustrates an electrical box cover 20*vi* of the present embodiments according to another approach in its environment. In this approach, a hole 57 is sized to receive the threaded or ribbed portion pin of push pin 52. Hole 57 is also placed to hover directly over a threaded bore 53 of an outlet device.

FIG. 15 illustrates the electrical box cover of FIG. 1 in its environment.

FIG. 16 illustrates the electrical box cover of FIG. 11 in its environment.

The drawings and the foregoing descriptions are not intended to represent the only forms of the electrical box protectors in regard to the details of construction. Changes in form and in proportion of parts, as well as the substitution of equivalents, are contemplated as circumstances may suggest or render expedient.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS 20, 20*i*, 20*ii*, 20*iii*, 20*iv* approaches for an electrical box cover of the present embodiments
22 flange
24 side wall/panels
25 key hole
26 round portion of keyhole opening
28 elongated narrower portion of keyhole opening
29 base/back panel
30 interior cavity
32 beveled/radiused/angled edge
34 protrusion/pin
36 taper angle 1-30 degrees, preferable about 10 degrees
38 external thread
40 ribs
42 side protrusions
44 openings configured to receive protrusions 42
50 flange openings configured to receive push pins 52
52 pliable push pins
53 threaded bore of an outlet device
54 push pin head
55 screws
56 push pin ribs
57 hole for 20*vi*
58 push pin head tab
60 plate
100 electrical box
102 back panel of electrical box
104 side panel of electrical box
106 tab to hold nail
108 nail
110 inwardly projecting protrusions of the electrical box
112 threaded bore of the inwardly projecting protrusions of the electrical box
114 interior cavity
116 house electrical supply
118 wall stud

I claim:

1. A protective cover comprising: a body configured to removably cover an opening of an electrical box where the electrical box has bore on inwardly projecting protrusions over the electrical box opening,
the protective cover body having
a back panel;
four side panels which project perpendicularly from the back panel;
the back panel and side panels together defining an interior cavity;
the side panels at the opposite ends from the back panel having a free front edge that collectively define an opening which provides access to the interior cavity;
a flange connected to the free edge of the side panels;
wherein the flange has a pair of ribbed pliable pins extending alongside the side panels, the pin placement correlating with the positions of the threaded bores of the of inwardly projecting protrusions extending across the electrical box opening;
wherein the cover is configured to not extend into the opening of the electrical box;
wherein the four side panels and back panel mated with the cover by a push pin extending through a cover hole and into a threaded bore of the electrical box completely enclose and are configured to protect the contents of the interior cavity of an electrical box having an electrical outlet installed thereon during construction; and wherein the pins can be tapered from a base to a distal end in a range of about 1 to 25 degrees, and that the distal end of the pins is narrower in diameter than the opening of the threaded bores and the base of pins would be between 0.01 mm to 3 mm greater than the diameter of the threaded bore.

* * * * *